Patented Apr. 15, 1947

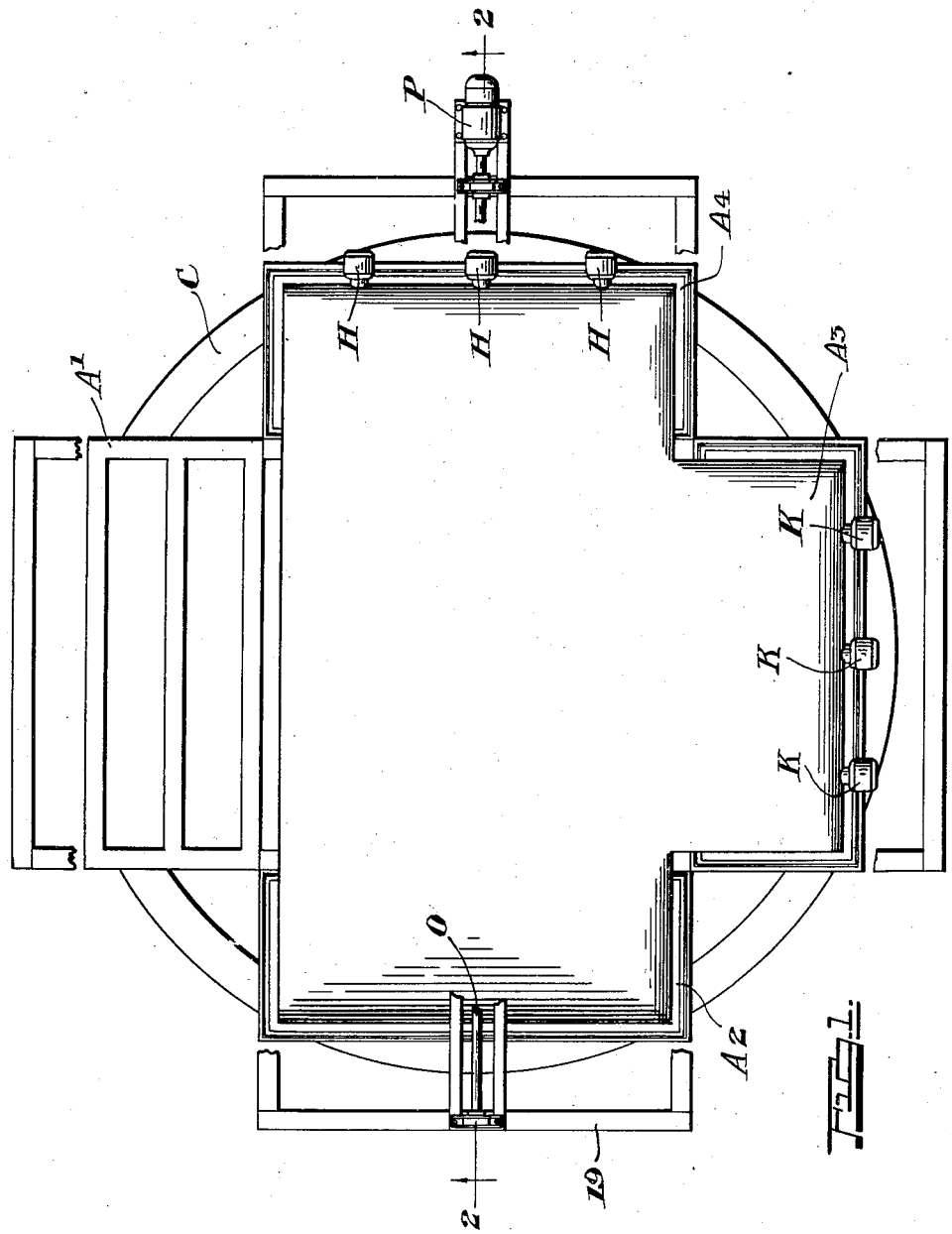

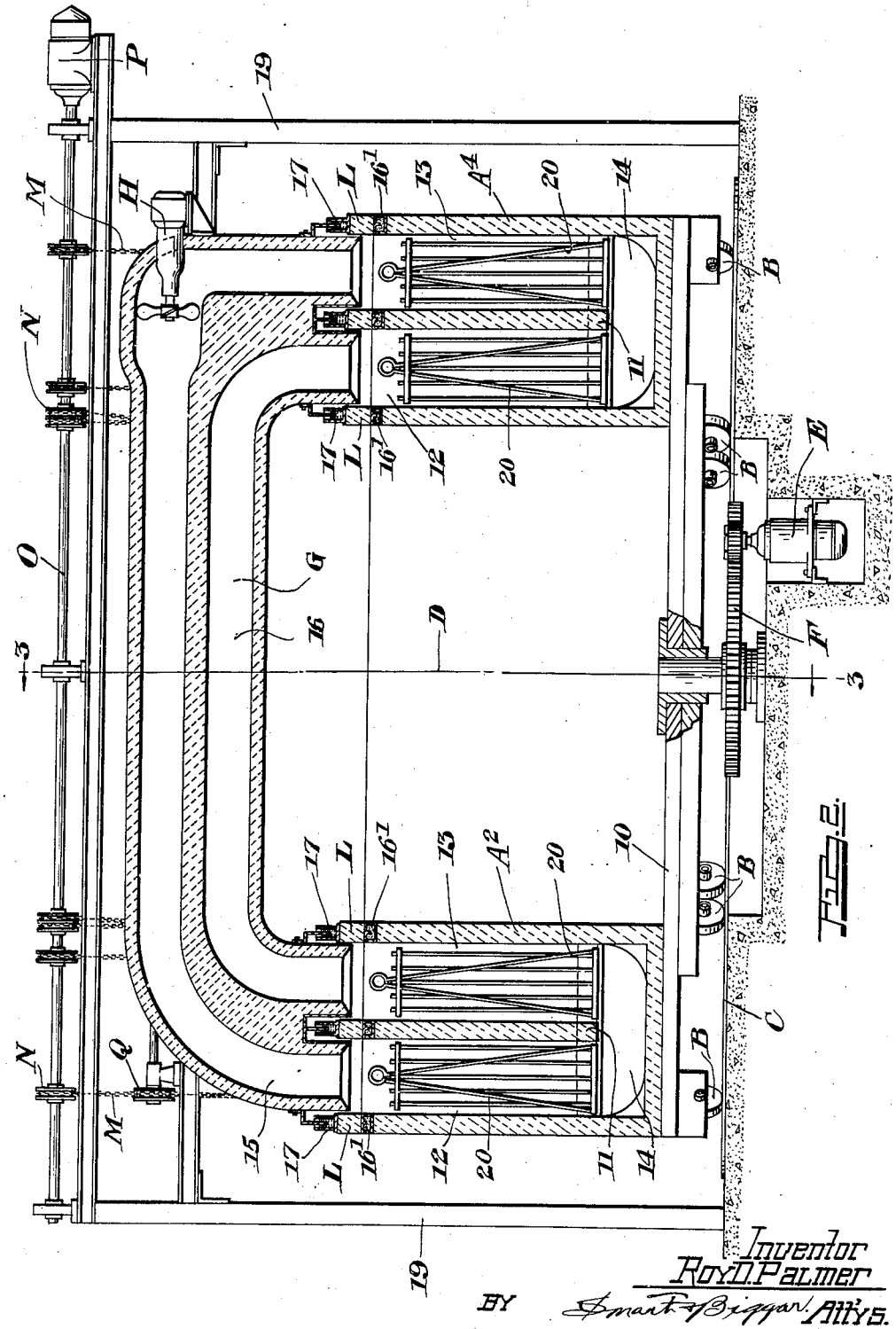

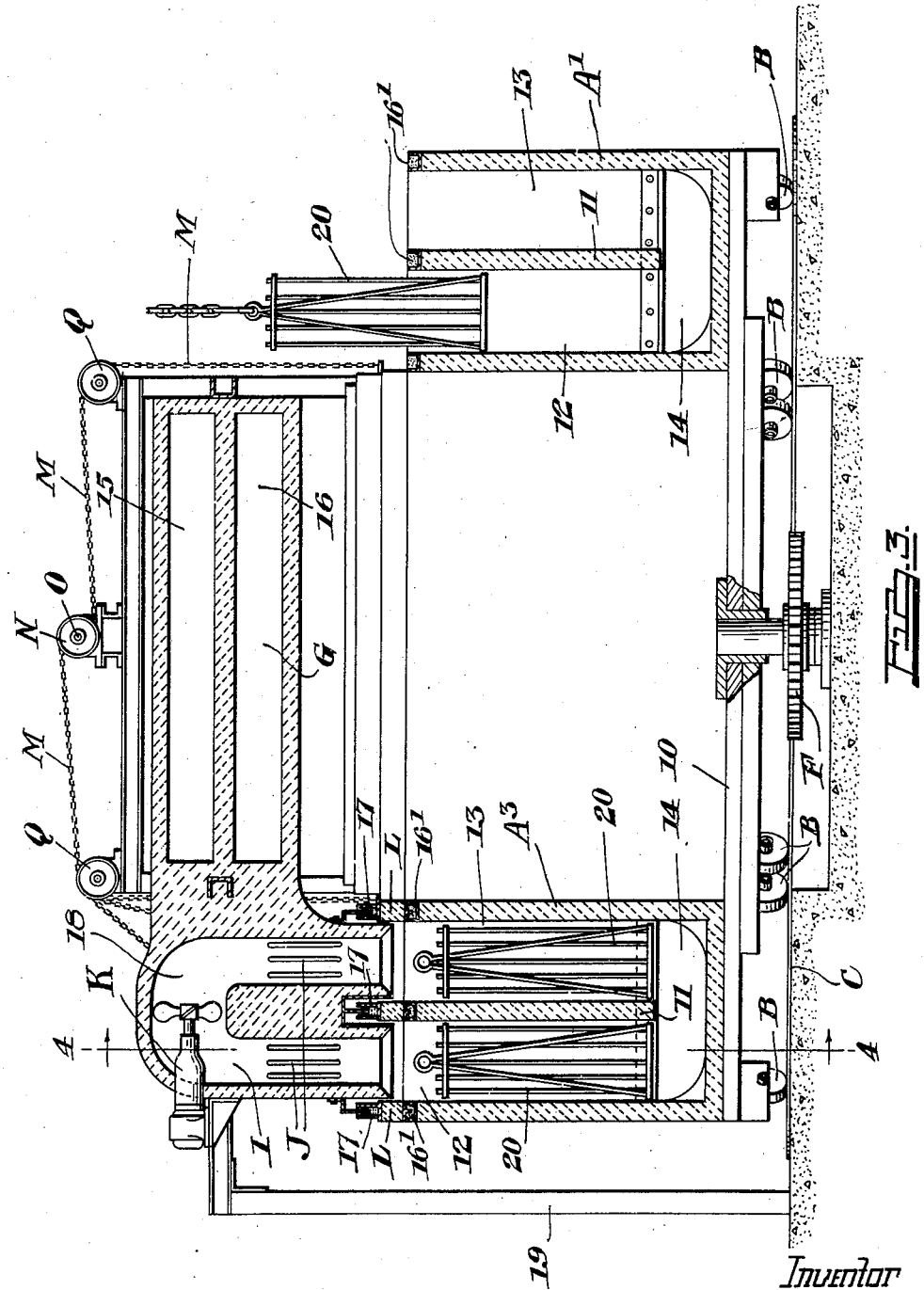

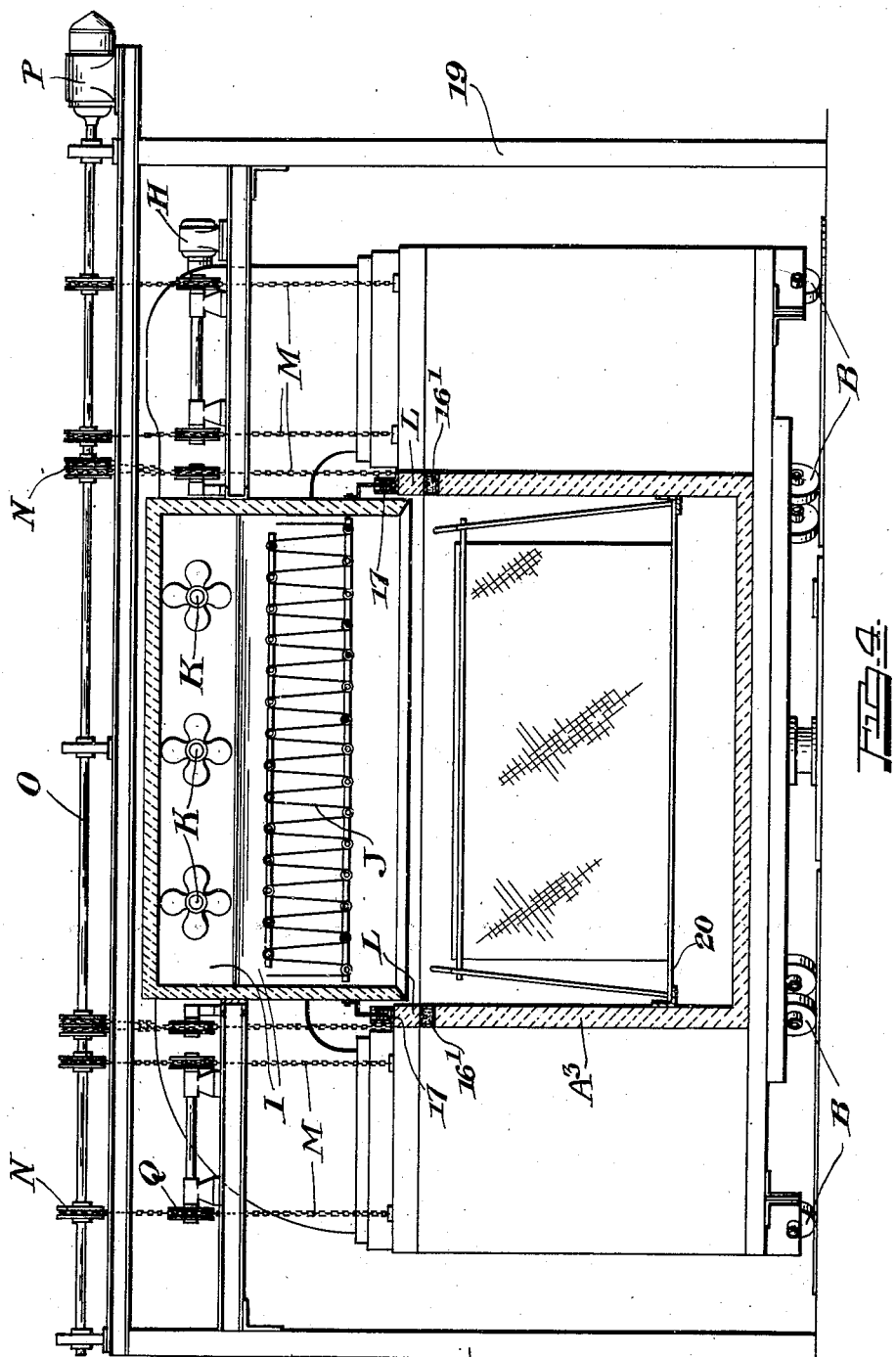

2,418,983

UNITED STATES PATENT OFFICE 2,418,983

RECUPERATIVE HEAT-TREATMENT FURNACE

Roy Dalliba Palmer, Montreal, Quebec, Canada, assignor to Aluminum Laboratories Limited, Montreal, Quebec, Canada, a corporation of Canada Application August 15, 1944, Serial No. 549,578
In Canada September 22, 1943

10 Claims. (Cl. 263—17)

This invention relates to improvements in recuperative heat treatment furnace such as may be advantageously used for the annealing of metals or for the treatment of any materials where it is possible to recover any of the heat applied, and the objects of the invention are to provide for increased economy in the recovery of heat and greater efficiency in operation.

The furnace consists of a group of four or more chambers which are held in fixed relation to each other and can be rotated as a group about a fixed vertical axis. Each chamber is the same radial distance from this axis as the other chambers and all chambers are equi-angularly spaced from each other. Also, equi-angularly spaced around this centre are as many fixed operating positions as there are chambers in the furnace group. One of these positions is the heating position, one, the unloading and reloading position and the others are recuperating positions. In the heating position hot gases are forced into and out of the chamber, thereby heating the material therein up to the heat treating temperature. In the recuperating position gas is forced through two chambers in series, in one of which is a load which has been previously heated in the heating position and in the other an unheat-treated load. The term "gas" as used in this specification is intended to include "air," and the air or gas circulation, is, of course, for the purpose of transferring the heat from the hot load to the unheat-treated load, thereby conserving energy. In the loading position the cooled material which has been heat treated is removed from the chamber and replaced by a cold load which is to be heat treated.

The transfer of heat and the supply of heat is preferably effected through the means of a vertically moving mechanical canopy member of special design positioned above the chambers and designed to be raised or lowered with respect to the same. One embodiment of the invention, in which the furnace has four chambers and four operating positions, is shown in the accompanying drawings in which -

Figure 1 is a plan view of the furnace;
Figure 2 is a sectional elevation on the line 2—2 of Fig. 1;
Figure 3 is a section on the line 3—3 of Fig. 2;
Figure 4 is a sectional elevation on the line 4—4 of Fig. 3;

Referring to the drawings A1, A2, A3 and A4 are the four furnace chambers constructed of suitable heat resisting material and equi-angularly spaced from each other. The furnace could, of course, have more than four chambers, but for the sake of simplicity only four are shown. These chambers are conveniently mounted on a common frame 10 supported by wheels B running on a track C. The frame of the furnace chambers may be rotated about an axis D by a motor E through suitable gears F. In their rotation about the vertical axis the furnace chambers are designed to come to fixed operating positions which are spaced to register with the furnace chambers. One of these positions is an unloading and loading position, one is the heating position and the others are intermediate recuperating positions.

In the drawings the chambers A2 and A4 are shown in the recuperating positions in which means are provided to effect transfer of heat between the chambers. The means which have been designed for this purpose comprise a canopy member G mounted above the chambers. As shown, each of the furnace chambers is formed with a vertical partition 11 dividing each furnace chamber into two compartments 12 and 13 connected by the passage 14 at the bottom. The canopy member is formed with two ducts 15 and 16 connecting respectively with the compartments 12 and 13. The connection between each furnace chamber and the canopy member is effected through vertical movable sealing sleeves L fitting the top of the chamber through the medium of sand seals 16¹, these sealing sleeves being vertically movable and being connected to the canopy member through suitable fluid seals 17 which may, if desired, be water cooled. These seals are of such character that they will permit the vertical movement of the sleeves L while maintaining a gas seal. When in the recuperating position, as shown in Fig. 2, air is circulated through the chambers A2 and A4 in series and through the loads therein by fans H.

The sealing sleeves L are designed to be raised and lowered by convenient means such as the motor P operating through shaft O and chain M attached to sheaves N and running over guide sheaves Q. In the lowered position these sealing sleeves L rest on the chambers, the joint between the chamber and sleeve being closed by the sand seals 16¹.

The chamber A3 is shown in the heating position in which it is connected to the heating means by the sealing sleeve L. The heating apparatus is of any convenient kind such as electrical heating coils J mounted in a duct chamber I of the canopy member G and having fans K therein designed to circulate the furnace gas through the heating element in the duct chamber I and thence through the load to be heated in the chamber A2. The chamber A1 is indicated in the loading and unloading position in which it is open at the top for easy access.

It will be observed that the duct 18 in the duct chamber I is of inverted U-shape, the depending branches of which connect with the compartments 12 and 13 and a portion of the heating unit J being located in each branch. The canopy member G may be supported in any convenient way, as by the frame 19.

While the furnace is shown with its base substantially floor level it obviously, if desired, could be wholly or partly placed in a pit below floor level.

In operation a load of material which has been previously placed on a rack 20 in such a way as to allow vertical air circulation through it is placed in each of the compartments 12 and 13 of chamber A1 which is in the loading and unloading position. After the load in the chamber A3 has reached its proper temperature and the heat transfer between the loads in the chambers A2 and A4 has been sufficient, all fans are shut down, the heating elements turned off, the sealing sleeves L raised by motor P and the furnace rotated through an angle of 90° by the motor E. The sealing sleeves L are again lowered, the furnace started and the heating elements turned on. If the rotation has been counter-clockwise this operation brings chamber A1 with its cold load into one of the recuperating positions, brings chamber A2 with its load which has been raised in temperature by recuperation from the load in chamber A4 into the heating position, brings chamber A3 with its load which has been brought to the proper temperature while in the heating position into the other recuperative position, and brings chamber A4 with its load, from which some of the heat has been recovered while it was in the recuperative position, into the loading and unloading position. In this position the load in A4 is removed from the chamber and replaced by a cold load and the cycle repeated.

The various operations relating to the rotation of the furnace may be actuated by a set of push buttons located at a convenient position, each operation being so interlocked with the others that no operation can be actuated out of turn nor until the previous operation has been completed. The operations may also be set in motion from a single push-button, the operations then following each other automatically.

It will be seen from the foregoing that the furnace has considerable ease of operation. No load has to be shifted from one chamber to the other and no damper need be operated. Maximum recuperation is possible since no heat is lost as the result of transfer from one chamber to another. The simplicity of design results in a low cost of maintenance, which is also due to the fact that there are no moving parts in the hot zone. It is further noted that only a single heating operation is required for the entire furnace and that the rates of cooling the material may be accurately controlled.

What I claim as my invention is:

1. A heat treatment furnace comprising a group of uniformly spaced chambers movable about their vertical axis to bring them successively to fixed operating positions, said furnace comprising a loading and unloading position, a heating position and intermediate recuperating positions, a canopy member having ducts designed to register with the chambers in recuperating positions and having means for circulating gas through the ducts, a heating chamber designed to register with the furnace chambers in the heating position, and vertically movable sleeves designed to form a connection between the canopy member and heating chamber and the appropriate furnace chambers.

2. A furnace as claimed in claim 1 in which sand seals are provided in the connection between the sleeves and the furnace chambers.

3. A furnace as claimed in claim 1 in which a fluid seal is provided between the canopy member and heating chamber and the sleeves.

4. A furnace as claimed in claim 1 in which the heating chamber forms part of the canopy member.

5. A furnace as claimed in claim 1 in which each chamber is divided into two compartments connected at the bottom and designed respectively to register with corresponding ducts in the canopy member.

6. A heat treatment furnace comprising a group of uniformly spaced chambers movable about their vertical axis to bring them successively into fixed operating positions, said operating positions comprising an unloading and loading position, a heating position and recuperating positions, a common frame supporting the chambers having wheels thereon, a track for supporting the wheels, a canopy member having circulating ducts designed to connect with the chambers in the recuperating positions, a fan for circulating gas through the said ducts, a heating chamber on the canopy member having ducts designed to register with the chamber in heating position, a fan therein for circulating gas through the heating chamber and the chamber below the same, movable sleeves designed to form a gas-tight connection between the chambers in recuperating and heating positions and the canopy, and means for raising and lowering the said sleeves.

7. A furnace as claimed in claim 6 in which the sleeves are designed to be simultaneously raised and lowered through a motor connected to the sleeves through a shaft, chain, sheaves and guide sheaves.

8. A furnace as claimed in claim 6 in which material racks are provided in each of the chambers.

9. A furnace as claimed in claim 6 in which a fluid seal is provided between the canopy and the sleeves which permits vertical movement of the latter.

10. A heat treatment furnace comprising a group of uniformly spaced chambers movable about their vertical axis to bring them successively to fixed operating positions, the said operating positions comprising an unloading and loading position, a heating position, and intermediate recuperating positions, and means for effecting interchange of heat between the chambers in the recuperating position, comprising ducts designed to register with the chambers which are in the recuperating position, and means for circulating gas through the ducts.

ROY DALLIBA PALMER.

REFERENCES CITED

The following references are of record in the file of this patent:

UNITED STATES PATENTS

| Number | Name | Date |
| --- | --- | --- |
| 1,870,551 | Brown | Aug. 9, 1932 |
| 1,727,192 | Baily | Sept. 3, 1929 |
| 1,919,650 | Hagan | July 25, 1933 |
| 1,903,909 | Cope | Apr. 18, 1933 |

FOREIGN PATENTS

| Number | Country | Date |
| --- | --- | --- |
| 207,823 | British | Feb. 26, 1925 |